United States Patent [19]
Ratcliff

[11] 3,795,952
[45] Mar. 12, 1974

[54] SLIP PROOF CABLE LOOP CONNECTOR
[75] Inventor: Ralph A. Ratcliff, Belmont, Calif.
[73] Assignees: Bruce E. Ratcliff; Sandra Ratcliff Sears
[22] Filed: Aug. 10, 1972
[21] Appl. No.: 279,305

[52] U.S. Cl. ............................................. 403/210
[51] Int. Cl. ............................................ F16g 11/00
[58] Field of Search .......... 24/115 H, 115 J, 115 K, 24/123 E, 123 G, 123 H, 129 R; 287/81

[56] References Cited
UNITED STATES PATENTS

| | | | |
|---|---|---|---|
| 1,680,346 | 8/1928 | Sunderland | 287/81 |
| 1,722,994 | 8/1929 | Burd | 24/129 R |
| 2,252,566 | 8/1941 | Hocher | 287/81 |
| 2,403,057 | 7/1946 | Davis | 287/81 |
| 3,656,797 | 4/1972 | Ratcliff | 294/82 R |
| 1,240,966 | 9/1917 | Gould | 24/134 R |

FOREIGN PATENTS OR APPLICATIONS
237,397   2/1962   Australia .......................... 24/123 G

*Primary Examiner*—Donald A. Griffin

[57] ABSTRACT

A connector for forming a loop in a cable so that the cable may be operatively connected with a load sustaining device, such as a load binder, hoist or the like. The connector is defined by a metal body having two sections, one of which comprises a central boss having an inclined wall about which the cable is to be looped in at least two turns. The inclined wall causes the cable to be securely wedged in slip proof engagement with the boss. The second portion of the body includes structure for assisting in maintaining secure engagement of the cable with the boss wall and for maintaining an unloaded reach of the cable in proper orientation relative to the boss. The connector may be secured to a hook of a load sustaining device by positioning the hook through an opening in the boss. In an alternate embodiment, the connector is provided with an integral headed shank which is releasably attachable to another load sustaining device.

14 Claims, 11 Drawing Figures

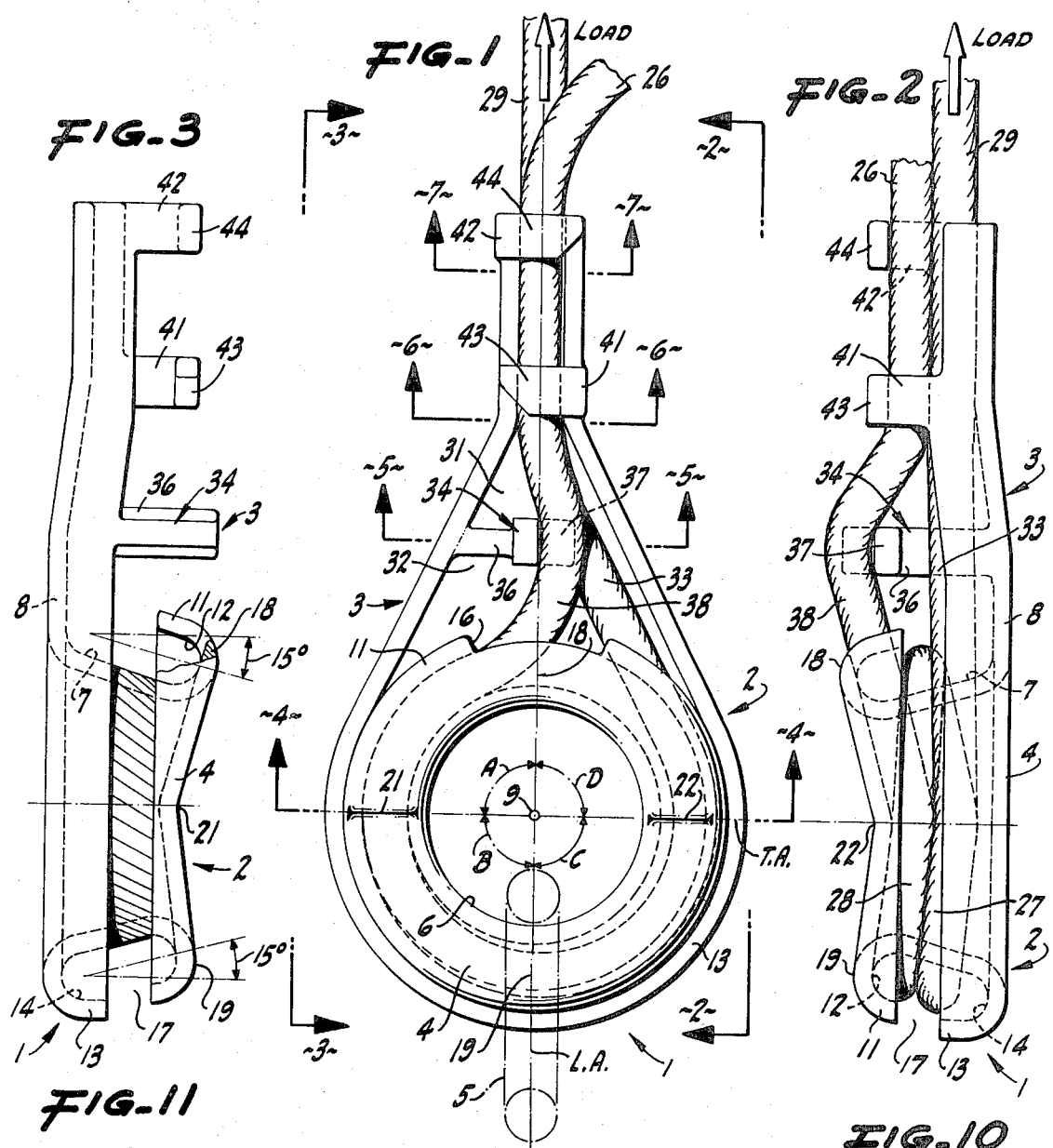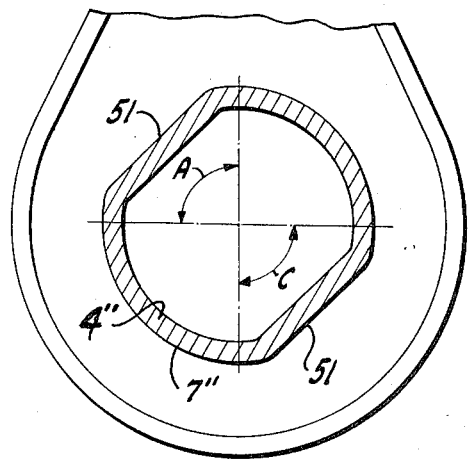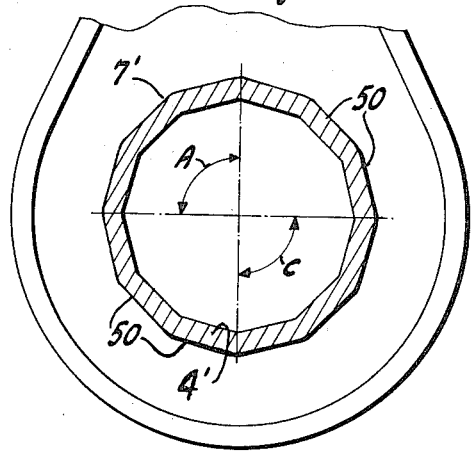

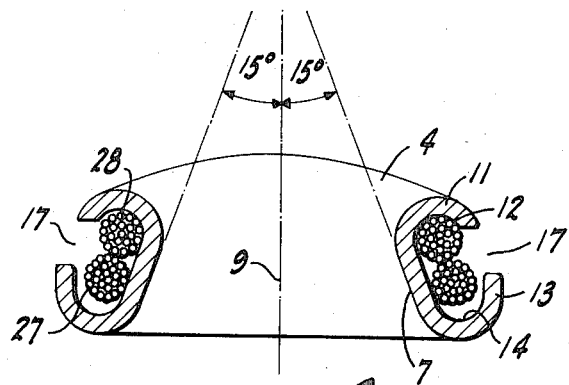
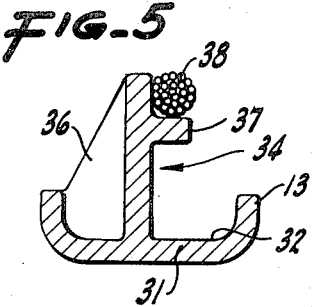
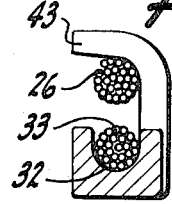
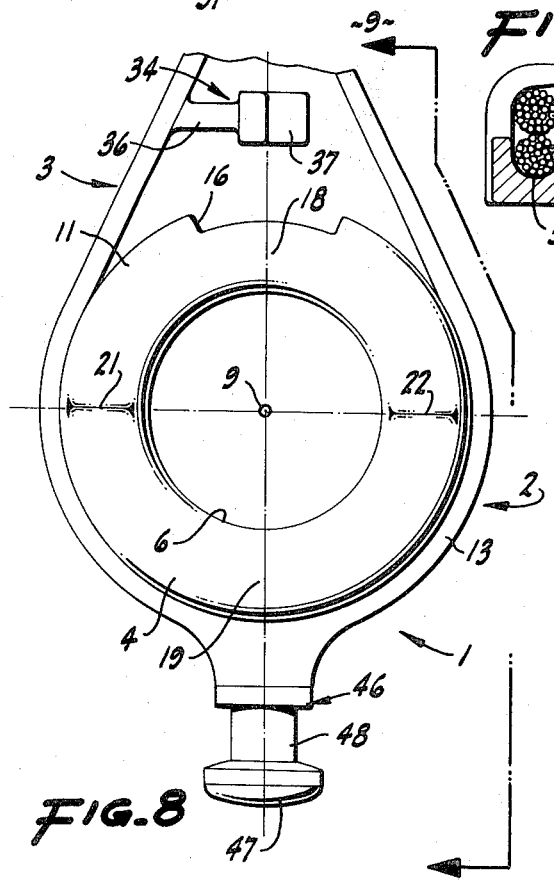
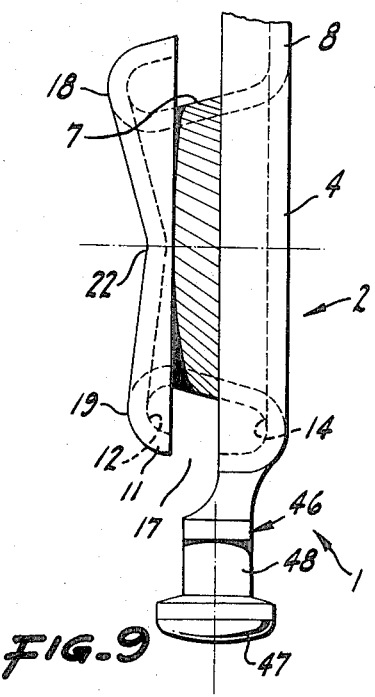

SLIP PROOF CABLE LOOP CONNECTOR

BACKGROUND OF THE INVENTION

1. Field of the Invention

This invention relates to the field of loading sustaining devices. More particularly, this invention relates to the field of devices for forming a loop intermediate the ends of a cable, such as a metal or non-metallic rope, so that such cable may be operatively connected with another load sustaining device such as a load binder, a ratchet hoist, a friction brake hoist, or other device commonly utilized for applying tension to a cable to support a load attached therewith.

Still more particularly, this invention relates to the field of connectors for forming a loop in a cable between opposite reaches thereof without requiring separate fastening means for precluding slippage of the reaches of the looped cable relative to each other. Still more particularly, this invention relates to the field of devices for quickly forming a non-slip loop in a cable so that the cable may be connected with another load sustaining device of any known type.

DESCRIPTION OF THE PRIOR ART

It has been commonly known heretofore to form a loop or eye in a cable, such as a metal or non-metallic rope, so that such cable may be operatively connected with another load sustaining device. Heretofore, such cable loops or eyes were commonly formed by swedging a collar around a looped end of the cable to secure the cable end in close abutting contact with an adjacent portion thereof. Alternately, a cable is unbraided at its end and the unbraided end is then laced with an adjacent portion thereof to provide a cable eye or loop. Additionally, heretofore it has been common to apply U-bolts or clamps around the looped end of a cable to hold a cable end in secure non-slip engagement with an adjacent portion of the cable. However, all of such prior known arrangements required essentially permanent securing means for forming the cable loop and, additionally, such prior known arrangements had the disadvantage of permitting the cable loop to be formed only closely adjacent one end thereof.

With the present invention, a cable loop or eye may be rapidly formed at any location along the length of an elongated cable which is most convenient for permitting connection of such cable with another load sustaining device. Additionally, the present invention has the advantage of permitting the rapid formation of a loop but also one which may be rapidly un-looped if it is desired to subsequently form a loop at another location along a cable length.

So far as is known, the particular cable connector structure disclosed herein has been unknown heretofore both commercially and in prior art patents and other written disclosures.

SUMMARY OF THE INVENTION

This invention relates generally to an improved means for permitting rapid formation of a cable loop or eye in a cable, such as a metallic or non-metallic rope. More particularly, this invention relates to a rapid cable connector by means of which a non-slip loop or eye may be formed at any location along the length of a cable in a rapid and simple loop forming operation which requires no additional fastening means to effect such loop.

Still more particularly, this invention relates to an improved connector for forming a non-slip loop in a length of cable at any desired location so that the cable may be secured to another load sustaining device, such as a load binder, ratchet hoist, friction brake hoist or other known devices for applying tension to the cable to sustain a load connected therewith.

From the foregoing it should be understood that objects of this invention include the provision of an improved connector for forming a loop or eye in a cable; the provision of an improved cable connector by means of which a non-slip loop may be rapidly formed in a length of cable so that the cable may be tensioned when the connector is engaged with another load sustaining device; the provision of an improved cable connector incorporating therein a central boss having an improved upstanding wall construction which insures wedging of the cable in locking fashion to provide a non-slip loop therein; and the provision of an improved cable connector having a particularly contoured and designed central boss and cooperable structure for insuring the maintenance of a loop in a cable at a predetermined location along the length thereof so that the cable may be connected in non-slip fashion with another load sustaining device.

These and other objects of this invention will become apparent from a study of the following disclosure in which reference is directed to the appended drawings.

DESCRIPTION OF THE DRAWINGS

FIG. 1 is a plan view of the subject cable connector showing two reaches of a cable operatively engaged therewith.

FIG. 2 is a side elevational view thereof taken in the plane of line 2—2 of FIG. 1.

FIG. 3 is a side elevational view from the opposite side of the connector taken in the plane of line 3—3 of FIG. 1 but showing the cable disengaged therefrom for purposes of clarity of illustration.

FIGS. 4, 5, 6 and 7 are sectional views through the cable connector taken in the planes of lines 4—4, 5—5, 6—6 and 7—7 respectively of FIG. 1.

FIG. 8 is a plan view of a portion of a modified embodiment of a cable connector of the subject invention showing an integral headed shank projecting longitudinally from an end of the connector for releasably attaching the connector with another load sustaining device.

FIG. 9 is a side elevational view of the modified embodiment of FIG. 8 taken in the plane of line 9—9 thereof.

FIGS. 10 and 11 are horizontal sectional views through the boss portion of the cable connector illustrating modified details of construction thereof.

DESCRIPTION OF THE PREFERRED EMBODIMENTS

As noted previously, this invention relates to a connector device for rapidly forming a loop or eye in a cable, of metal such as steel, or non-metal such as nylon or hemp, in rapid and non-slip fashion at any predetermined location along the length of the cable. Thus, the cable may be rapidly and securely attached to another load sustaining device, such as a load binder, ratchet hoist or friction brake hoist, or similar device, commonly utilized in the public utility and construction industries as well as other fields. As will become evident hereinafter, the connecting and looping function performed by the subject connector is analogous to the function of a capstan, but in an improved fashion, so that the tail end or unloaded reach of the cable need not be secured or held by a person or other external securing means. In that regard, the connector is formed with an improved construction so that the cable is easily engaged with or disengaged from the connector. Thus, in distinction to prior known means for forming loops or eyes in cable which required separate fastening means or resulted in substantially permanent formation of a loop or eye therein only adjacent an end thereof, with the present arrangement, a disengageable loop may be easily formed in a cable at any desired location along its length.

Additionally, with the present connector, once a loop is formed in a cable by utilizing the connector, such loop remains therein whether the cable is under load or no load conditions until the loop is intentionally removed. Furthermore, no damage is caused to the cable while the same is looped around the subject connector.

The connector body is of one piece construction and may be produced by any suitable manufacturing procedure, such as shell molding, forging with accompanying machining operations, or welding from several discrete pieces separately formed in any suitable manner.

Referring first to FIG. 1 through 3, the subject cable connector, generally designated 1, is defined by an integral one piece metal body, formed from any suitable high strength material, such as steel or a suitable aluminum alloy. The connector body includes two integral body portions, designated 2 and 3.

The first body portion 2 comprises a closed loop section defined by a generally circular central apertured boss 4 having a circular opening 6 extending centrally therethrough. Such central opening is provided so that a portion of another load sustaining device, such as the hook of a chain hoist or a link of a chain, generally designated 5, may be engaged therewith as seen in dotted lines in FIG. 1. Thus, tension may be applied to the cable looped with the connector as will be described. As noted from the drawings, the embodiment shown in FIGS. 1–3 incorporates a generally circular boss. Alternate embodiments to be described hereinafter have a modified boss construction but maintain a generally circular configuration also.

The second body portion 3 is formed integral with the first mentioned body portion 2 and extends generally longitudinally thereof. The purpose of the second body portion is to insure proper alignment of the two reaches of the cable being looped and to maintain the proper position of the free end or unloaded reach of the cable so that cable unlooping is precluded.

In that regard, referring to FIG. 1, the connector 1 has a longitudinal axis extending lengthwise thereof, designated L.A., and a transverse axis extending normal to the longitudinal axis, designated T.A. It will be noted that the longitudinal and transverse axes intersect each other at a central location coinciding with the center 9 of the opening 6 extending through the boss 4 of the cable connector.

Referring now to FIGS. 2, 3 and 4, it will be noted that the central boss 4 is defined by a generally circular inner wall 7 which extends in generally upstanding relationship from the generally flat base 8 of the connector.

The upstanding boss wall provides a generally circular surface about which the reaches of the cable being looped are to be wound in at least two turns.

As best seen from FIG. 4, the upstanding base wall is inclined upwardly and inwardly at a predetermined angle relative to the central axis of the boss which extends through the center 9 thereof. It has been determined that such angular inclination of wall 7 desirably lies within the range of approximately 10° to 20°, with an angle of inclination of approximately 15° being preferred. The purpose and function of such inclined wall will be described hereinafter.

At its upper margin, the boss wall terminates in a reversely turned downwardly facing flange or lip, generally designated 11, which surrounds the wall 7 and defines an upper open annular channel 12. At its bottom margin, the inclined wall 7 is provided with a reversely turned upwardly facing flange or lip, generally designated 13, which defines a bottom open annular channel 14.

From FIG. 1 it will be noted that the upper lip 11 is discontinuous in an area lying on either side of the longitudinal axis L.A. as seen at 16 in such figure. That is, the lip is partially cut away in the area 16 (for approximately 15° on either side of the longitudinal axis) to preclude interference by such lip with the cable engaged with the boss. Thus, cutting, crimping or marring of the cable by the free edge of the lip 11 is precluded.

As perhaps best seen in FIG. 1, the lower lip 13 lies radially outwardly of the upper lip 11 because of the upward and inward inclination of the wall 7. As also seen in FIGS. 2 and 3, the opposed free edges of the respective upper and lower lips 11 and 13 are spaced from each other to provide a peripheral gap 17 therebetween to permit insertion and removal of the cable in turns around the boss section.

Referring again to FIG. 1, it will be noted that the boss 4 is divided into four generally equal quadrants each of which extends 90° about the vertical axis 9 extending through the center of the boss. Such quadrants are identified by reference letters A, B, C and D respectively. Quadrant A begins with the longitudinal axis and extends counterclockwise in FIG. 1 to the transverse axis; quadrant B commences with the transverse axis and extends counterclockwise to the longitudinal axis; quadrant C begins with the longitudinal axis and extends counterclockwise to the transverse axis; and quadrant D commences with the transverse axis and extends counterclockwise to the longitudinal axis, thus completing the circle.

Preferably, as best seen in FIG. 3, the outer surface of the inclined boss wall 7 is roughened or serrated throughout its full vertical extent and in the area defining the undersurface of the reversely turned upper lip 11. Such roughening enhances non-slip engagement of the cable turns therewith. While the configuration or nature of such roughening may vary, it has been found desirable to form such roughening in accordance with the woven pattern and spiral outer configuration encountered with most conventional fabric or metal cables. Thus, the high and low portions of a spirally wound cable may fit into the angled grooves or depressions of the serrations formed in the surface of the wall 7 and upper channel 12 in any suitable fashion during manufacture of the cable connector.

It will be noted from FIGS. 2 and 3 that the downwardly turned upper lip 11 tapers downwardly and inwardly toward the base 8 of the connector from opposite high points which lie in line with the longitudinal axis of the connector. That is, the upper surface of the boss defined by lip 11 progressively tapers downwardly toward the base of the lower channel 14 from high points, designated 18 and 19, aligned with the longitudinal axis, to low points, designated 21 and 22, aligned with the transverse axis. Thus, quadrant A tapers progressively downwardly toward the base of channel 14 from the longitudinal axis to the transverse axis, while quadrant B tapers progressively upwardly from the transverse axis to the longitudinal axis. Quadrant C tapers progressively downwardly from the longitudinal axis to the transverse axis while quadrant D tapers progressively upwardly from the transverse axis to the longitudinal axis. Such alternate quadrant tapering is provided in the connector to insure secure wedging of a cable turn in non-slip fashion with the undersurface of the upper lip 11 as will be described.

Engagement of a flexible cable with the subject cable connector is rapidly and easily effected by grasping a free or unloaded reach 26 of the cable and winding the same at least twice around the central boss of the connector in the manner best seen in FIG. 2. That is, by grasping the unloaded reach 26 and winding the same in two overlying turns 27 and 28 about the boss 4 in engagement with the tapered wall 7 thereof, a cable may be securely engaged with the connector. Disengagement of the cable once properly positioned, will be precluded in the manner to be described.

It should be understood from FIG. 2 that the lower turn 27 of the cable is directly connected with the reach 29 of the cable by which a load is supported in the manner indicated by the arrow in FIGS. 1 and 2. Free of unloaded cable reach 26, it should be understood, is not to be engaged with any load or load sustaining device, and hangs freely after the loop has been formed in the cable in the manner illustrated.

As noted from FIG. 2, the inward tapering of alternate quadrants A and C results in secure clamping of the cable in wedging fashion in such quadrants. That is, because of the load applied to cable reach 29 when the connector is secured to another load sustaining device, the lower cable turn 27 urges the upper turn 28 into secure wedging engagement with the undersurface of the upper boss lip 11. Thus, such wedging action precludes slippage or movement of either reach of the cable when the cable is positioned as shown in FIG. 2.

In that connection, the second body portion 3 of the connector includes structure for positively maintaining the cable wound around the boss in the manner seen. To that end, the body portion 3 is integrally connected with the first body portion 2 by a generally flat open or fan-shaped base 31 which forms a continuation of the boss base 8. Base portion 31 is formed by converging continuations of the lower lip 13 in the boss section and defines an open channel 32 in which a portion 33 of the cable lies. Such portion 33 forms part of the loaded reach 29 of the cable as seen in FIG. 1.

Positioned in and extending upwardly from the fan-shaped channel is strut structure, generally designated 34, which is defined by an upstanding rib 36 formed integrally with the base 31 of the second body portion. Such rib terminates adjacent its upper end in a ledge section 37 over which a portion 38 of the unloaded cable reach 26 is engaged. In that connection, it will be noted from FIG. 1 that the cable portion 38 extends through the open area 16 formed in the upper lip 11 so that damaging engagement of the cable with an abrupt edge of such lip is obviated.

The upward inclination of cable portion 38 over the ledge 37 of the strut structure, as best seen in FIG. 2, maintains the upper turn 28 of the cable in proper engagement with the undersurface of the upper lip 11. Such upward inclination of the cable portion 38, coupled with the wedging action of the lower cable turn 27 on the upper turn 28, produces the non-slip engagement of the cable with the boss as described previously.

While the construction thus far described would be satisfactory in maintaining the cable in secure non-slip engagement with the connector, it has been found desirable to provide additional means to assist in holding the unloaded reach 26 of the cable generally in alignment with the loaded reach for a portion of their respective lengths. To that end, the second body portion 3 of the connector is provided with longitudinally spaced shoulder structures, designated 41 and 42 respectively. Each of such shoulder structures comprises an upstanding tab which projects from lateral margins of the connector body portion 3, and which terminates in an inwardly turned lip 43 and 44 respectively, such lips facing in opposite directions as best seen in FIG. 1. Preferably, corners of the lips are beveled to facilitate engagement of the unloaded cable reach beneath such lips as seen in FIG. 2.

As seen in FIGS. 5 through 7, the second body portion 3 of the connector includes a narrow continuation of the open channel 32 for the length of the connector in the area underlying the shoulders 41 and 42 respectively. The loaded reach 29 of the cable lies smoothly in the channel continuation as seen in FIGS. 6 and 7.

Thus, the cable is securely engaged with the connector by passing the same at least twice around the central boss and thereafter positioning a portion 38 of the unloaded reach 26 over the ledge 37, followed by alternately positioning such reach beneath the lips 43 and 44 of the shoulder structures. To separate the cable from the connector it is merely necessary to reverse the process described, namely to disengage the unloaded reach 26 from beneath the lips 44 and 43 of the spaced shoulders and to unwind the two turns from around the boss by removing the same laterally through the gap 17 between the upper and lower lips 11 and 13 of the boss.

While the connector illustrated may accommodate therein cables of various diameters, preferably the connector chosen is selected in accordance with the diameter of a particular cable to be utilized therewith. That is, for most effective results, a cable of given size will be utilized with a connector specially designed and constructed for use therewith.

With the embodiment of the cable connector shown in FIGS. 1 through 3, the same is designed to be engaged with another load sustaining device illustrated by hook or chain link 5 by engaging the latter through the central opening 6 in the boss.

In FIGS. 8 and 9, however, a modified embodiment is shown in which integral means are provided for connecting the cable connector with another load sustaining device, such as a load binder or hoist. To that end, an integral headed connecting shank, generally designated 46, is formed in one part with the boss portion of the body. Shank 46 projects longitudinally from one end of the connector as seen.

Shank 46 embodies a construction of the general type shown in applicant's U.S. Pat. No. 3,656,797 entitled "Hoist Housing-Hook Combination" issued Apr. 18, 1972. As noted in such patent, the purpose of such shank, which includes an enlarged head 47 at its free end and a reduced diameter neck portion 48 between such head and the location at which the same is integrally connected with the boss, is as disclosed in applicant's said patent and permits the shank to be slidably interconnected with another member, such as the slotted casing of a hoist or like load sustaining device.

With the integral connecting shank construction of FIGS. 8 and 9, the cable connector of the subject invention may be easily engaged and disengaged with another load sustaining device so that tension may be applied selectively and to the degree desired to securely hold a load or support a load with the load reach 29 of the cable looped around the subject connector.

As noted previously, the inclined wall 7 of the generally circular boss portion of the cable connector embodiments shown in FIGS. 1 through 9 is roughened or serrated to enhance nonslip engagement of a cable therewith. In the modifications shown in FIGS. 10 and 11, modified boss constructions are illustrated which also are designed to enhance the non-slip cable holding capability of the connector.

In FIG. 10, the inclined wall 7' of boss portion 4' is formed with a generally circular configuration defined by a plurality of short generally straight flat sections 50 which impart a polygonal contour to the outer peripheral surface of the wall. Such short flat sections 50 thus provide a type of serration or roughening which facilitate gripping of the cable by the boss in non-slip wedging fashion as described previously.

In FIG. 11, the inclined wall 7" of boss portion 4" is provided with two opposed generally straight flat sections 51 in the opposed quadrants A and C in which the cable is tightly wedged as described previously. Such opposed flat sections 51 in the wedging quadrants of the boss also define a form of roughening or serration within the context of this application which facilitates gripping of the cable by the boss in non-slip wedging fashion as previously described. The flat sections 51 illustrated preferably are short (for example, approximately 1/3 to 1/2 the quadrant length) so that the generally circular configuration of the boss wall is retained. Such generally circular configuration is desired to prevent the formation of sharp bends in the cable being looped around the boss to preclude damage thereto.

Having thus made a full disclosure of two embodiments of this invention, reference is directed to the appended claims for the scope of protection to be afforded thereto.

I claim:

1. A load sustaining connector for rapidly forming a non-slip loop in a cable to adapt the same for connection with another load sustaining device, comprising a metal body defined by integral first and second body portions; said first body portion comprising a closed loop section defined by a generally circular boss having an opening therethrough and an open channel therearound, said boss having a generally upstanding wall about which a cable is to be looped in at least two turns, said wall terminating in a reversely turned downwardly facing lip against the undersurface of which an upper turn of said cable is to be wedged by a lower turn thereof to preclude separation of said cable from said boss, said boss wall being inclined upwardly and inwardly from the base of said channel toward said reversely turned lip, said inclination of said wall causing such cable upper turn to be wedged securely against the undersurface of said lip as load is applied to one reach of said cable; said second body portion including structure with which an unloaded reach of said cable is engageable to maintain said cable in proper engagement with said boss wall.

2. The connector of claim 1 in which said boss wall is inclined at a predetermined angle within the range of approximately 10° to approximately 20° relative to an axis passing through the center of said boss.

3. The connector of claim 2 in which said wall inclination is approximately 15° relative to said axis.

4. The connector of claim 1 in which the surface of said boss wall and the undersurface of said reversely turned lip are roughened to enhance engagement of said cable turns therewith in non-slip fashion.

5. The connector of claim 1 in which said boss defines four generally equal quadrants therein defined by intersecting longitudinal and transverse axes of said connector, said reversely turned lip tapering downwardly and inwardly in alternate quadrants so that said lip is spaced progressively closer to the base of said channel in the quadrants which terminate at the transverse axis of said boss and progressively farther from said channel base in the quadrants which terminate at the longitudinal axis of said boss.

6. The connector of claim 5 in which said boss is constructed so that said upper cable turn is securely wedged by the underlying cable turn against the undersurface of said downwardly facing lip in alternate quadrants which commence at the longitudinal axis of said connector and terminate at the transverse axis thereof.

7. The connector of claim 5 in which said boss wall is provided with a roughened surface at least in said alternate quadrants.

8. The connector of claim 7 in which said roughened boss wall surface is defined by at least one generally straight flat section in each of said alternate quadrants.

9. The connector of claim 1 in which said boss channel terminates in a reversely turned upwardly facing lip which defines the outer margin of said boss, the edges of said downwardly and upwardly facing lips being spaced from each other a distance sufficient to permit passage of said cable therethrough during looping thereof around said boss wall.

10. The connector of claim 1 which further includes an integral connecting head shank projecting longitudinally from said first body portion generally along the axis thereof for releasably attaching said connector with another load sustaining device.

11. The connector of claim 1 in which said structure of said second body portion includes a strut over which said unloaded cable reach is engaged when said cable is looped around said boss wall.

12. The connector of claim 11 in which said open channel surrounding said boss communicates with an open channel in said second body portion which is defined by continuations of an upwardly facing lip surrounding said boss, said strut structure projecting upwardly from the base of said last mentioned channel generally at the juncture between said two body portions.

13. The connector of claim 12 in which said second body portion further includes oppositely facing spaced shoulder members projecting upwardly from said upwardly facing lip continuations on opposite sides of said channel in said second body portion for maintaining said unloaded reach of said cable generally in line with said loaded reach thereof.

14. The connector of claim 11 in which said second body portion includes spaced shoulder structures adjacent said strut structure with which the unloaded reach of said cable is engageable for maintaining the same generally in line with said loaded reach.

* * * * *